United States Patent [19]

Jacobson et al.

[11] 4,208,474

[45] Jun. 17, 1980

[54] CELL CONTAINING ALKALI METAL ANODE, CATHODE AND ALKALI METAL-METAL-CHALCOGENIDE COMPOUND SOLID ELECTROLYTE

[75] Inventors: Allan J. Jacobson, Princeton; Bernard G. Silbernagel, Scotch Plains, both of N.J.

[73] Assignee: Exxon Research & Engineering Co., Florham Park, N.J.

[21] Appl. No.: 974,021

[22] Filed: Dec. 28, 1978

[51] Int. Cl.² .............................................. H01M 6/18
[52] U.S. Cl. .................................... 429/191; 429/218
[58] Field of Search ............................... 429/191, 218

[56] References Cited

U.S. PATENT DOCUMENTS

| | | | |
|---|---|---|---|
| 3,751,298 | 8/1973 | Senderoff | 136/6 F |
| 3,791,867 | 2/1974 | Broadhead et al. | 136/6 F |
| 3,864,167 | 2/1975 | Broadhead et al. | 136/6 LN |
| 3,877,984 | 4/1975 | Werth | 136/6 F |
| 3,925,098 | 12/1975 | Saunders | 136/6 LF |
| 3,988,164 | 10/1976 | Liang et al. | 429/191 |
| 4,066,824 | 1/1978 | Rao | 429/191 |
| 4,075,397 | 2/1978 | Francis et al. | 429/191 |
| 4,115,633 | 9/1978 | Kasper et al. | 429/191 |

OTHER PUBLICATIONS

Hellstrom et al, Phase Relations and Charge Transport in Ternary Aluminum Sulfides, Extended Abstracts, vol. 78-1, Electrochemical Soc., pp. 393-395, May 1978.

*Primary Examiner*—Donald L. Walton
*Attorney, Agent, or Firm*—Kenneth P. Glynn

[57] ABSTRACT

A novel electrochemical cell is disclosed which contains an alkali metal anode, an electrolyte and a chalcogenide cathode wherein the electrolyte is a solid composition containing an electrolytically active amount of one or more compounds having the formula:

$$A_xB_yC_2$$

wherein A is an alkali metal, wherein B is an element selected from the group consisting of boron and aluminum, wherein C is a chalcogen, wherein x and y are each greater than zero and wherein $x+3y=4$. A preferred compound is $LiBS_2$. A preferred cell is one having a lithium-containing anode, a titanium disulfide cathode-active material cathode and the mentioned electrolyte compound.

34 Claims, 3 Drawing Figures

CELL CONTAINING ALKALI METAL ANODE, CATHODE AND ALKALI METAL-METAL-CHALCOGENIDE COMPOUND SOLID ELECTROLYTE

BACKGROUND OF THE INVENTION

1. Field of the Invention

This invention relates to a novel electric current producing cell. More particularly, this invention relates to improvements in electric current producing cells having alkali metal-containing anodes, electrolytes and cathodes, wherein the electrolytes are solid materials. The present invention is more specifically directed to electric current-producing cells having alkali metal-containing anodes, solid electrolytes and cathodes containing one or more chalcogenides as the cathode-active material.

2. Description of the Prior Art

There has been considerable interest in recent years in developing high energy density batteries or voltaic cells. Among the systems being investigated are those employing nonaqueous liquid, fused or solid electrolytes, with lightweight metals, such as alkali metals, as anodes, and with cathodes containing metal chalcogenide compounds. Such systems are described, for example, in U.S. Pat. Nos. 3,988,164; 3,925,098; 3,864,167 and 3,791,867.

Various efforts have been made to develop new solid state electrolytes for secondary cell systems. Alkali metal-aluminum-chlorine and alkali metal-aluminum-bromine compounds have been utilized in liquid and molten state electrolyte systems (e.g., as described in U.S. Pat. Nos. 3,877,984 and 3,751,298) and solid alkali-metal-aluminum-halogen compound electrical conductivity studies have been made. Recently issued U.S. Pat. No. 4,066,824 to Rao et al. describes electrochemical cells having alkali metal anodes, metal chalcogenide cathodes, and solid electrolytes, these electrolytes being essentially one or more solid alkali metal aluminum tetrahalide compounds.

U.S. Pat. No. 4,115,633 describes cells with $AB_xC_y$ solid electrolytes wherein A is a metallic atom with an atomic number no greater than 55, B is a group IIIA metallic atom, C is a group IVA atom, and x and y are such that the compound is essentially electrically neutral. This reference does not teach the use of boron as a B-type atom, nor does it specifically teach the use of aluminum as a B-type atom, albeit aluminum is encompassed generically. The patent suggest gallium and indium as effective B-type atoms and nowhere shows examples or states specific use of any other B-type atoms. Further, the cathodes described therein are elemental or otherwise non-chalcogenide. Hellstrom et al., Electrochemical Society, Extended Abst., Vol. 78-1, pp. 393-5 (1978) describe the compounds $LiAlS_2$, $NaAl_2$, $KAlS_2$, $Na_2S.(9-11)Al_2S_3$, $K_2S.(9-11)Al_2S_3$ and $LiAl_5S_8$ and some ionic conductivity measurements, but nowwhere suggest battery utility, much less batteries with chalcogenide cathodes. In summary, to date there has been no suggestion that the alkali metal-metal-chalcogen compounds used in the present invention might be useful in solid state electrolyte systems having alkali metal anodes and chalcogenide cathodes.

SUMMARY OF THE INVENTION

A novel electrochemical cell is disclosed which contains an alkali metal anode, an electrolyte and a chalcogenide cathode, wherein the electrolyte is a solid composition containing an electrolytically active amount of one or more compounds having the formula:

$$A_xB_yC_2 \tag{1}$$

wherein A is an alkali metal, wherein B is an element selected from the group consisting of boron and aluminum, wherein C is chalcogen selected from the group consisting of sulfur, selenium, and tellurium, wherein x and y are each numerical values greater than zero, and wherein $x+3y=4$.

DETAILED DESCRIPTION OF THE INVENTION

Figure 1:
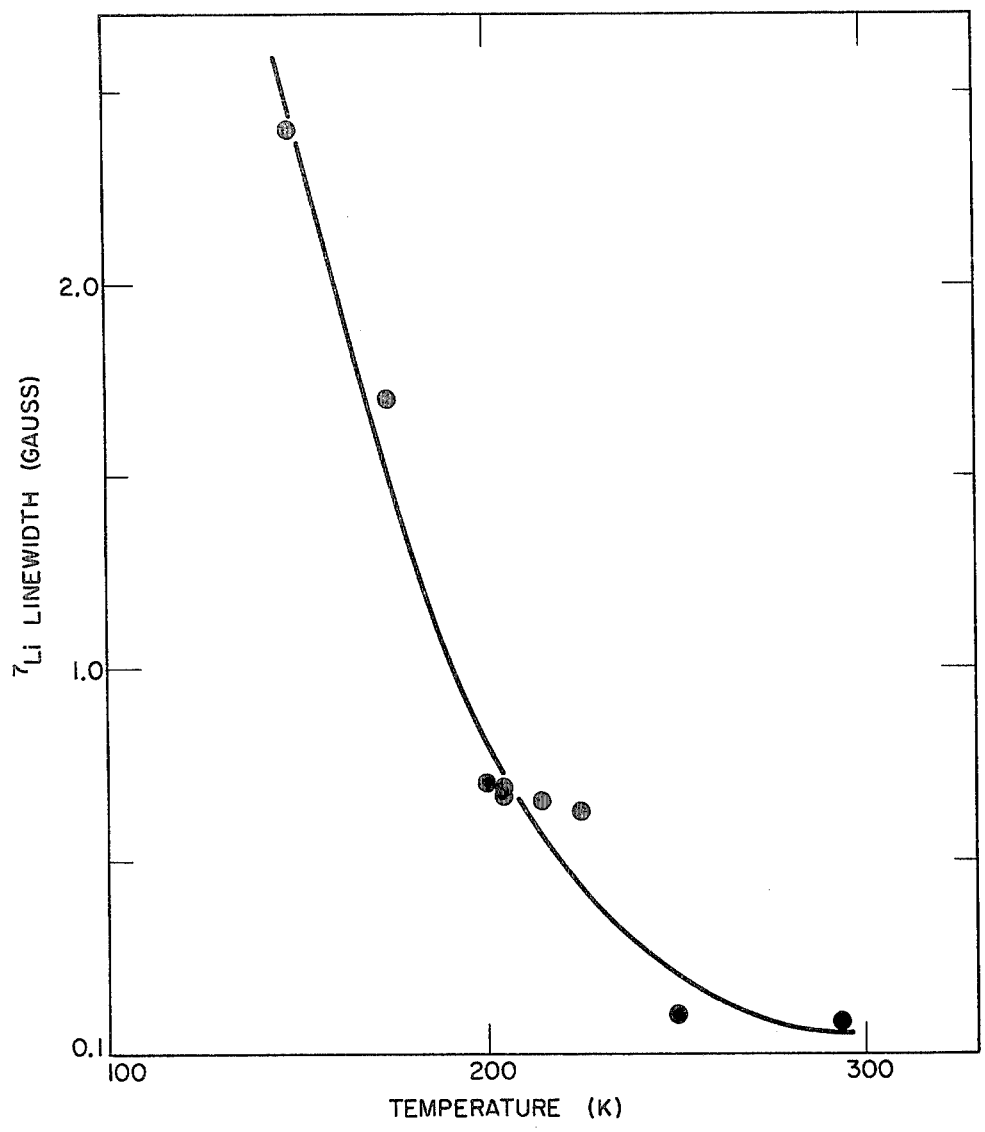

The novel electric current-producing cell of the present invention is a solid state cell which contains an alkali metal anode, a chalcogenide cathode and a solid electrolyte. By "solid state" is meant a cell from which electric current may be drawn at temperatures below the melting point of the electrolyte.

The anode employed in the cell of the present invention is, as mentioned, one which contains an alkali metal as its anode-active material. Desirably, this anode-active material is sodium, potassium, lithium, or alloys containing these. It should be noted, therefore, that when the specific alkali metals are recited herein with respect to the anode, such recitations are meant to include alloys of such alkali metals. The anode-active material used in the anode of the present invention is preferably sodium or lithium, and is most preferably lithium. These anode-active materials may, for example, be in contact with other metal structures, e.g., nickel, copper or silver screen, which serve as current collectors and are well known in the art.

The cathode used in the cell of the present invention may be any chalcogenide-containing cathode which produces electric current when coupled with an alkali metal anode and which will function using the specific solid electrolyte described herein. A useful chalcogenide-containing cathode for the cell of the present invention is one which contains as its cathode-active material one or more chalcogenide compounds selected from the group consisting of the sulfides, the selenies, and the tellurides of titanium, zirconium, hafnium, niobium, tantalum and vandium. In general, such chalcogenides contain about 1.8 to about 3.2 atoms of the chalcogen per metal atom. Advantageously, these chalcogenides are the sulfides, the selenides, and the tellurides of one or more metals selected from the group consisting of titanium, niobium, tantalum and vanadium. Preferred are the titanium chalcogenides. Among the chalcogens employed in the chalcogenides used as the cathode active materials are, as mentioned, sulfur, selenium, and tellurium. Of these, sulfur and selenium are desired, and sulfur is preferred. Also, among the chalcogenides, those which contain about 1.8 to about 2.1 atoms of chalcogen per metal atom, commonly referred to as dichalcogenides, are preferred.

Examples of cathode active materials which may be useful, and which are selected from the above-mentioned chalcogenides, are titanium disulfide, zirconium disulfide, hafnium disulfide, niobium triselenide, tantalum disulfide, tantalum trisulfide, vanadium disulfide, vanadium diselenide, and vanadium ditelluride. Also included are the chalcogenides having more than one of the mentioned metals, e.g., $V_{0.25}$, $Ti_{0.75}$, $S_{2.0}$. Other possible chalcogenides such as iron vanadium sulfide, amorphous vanadium sulfides (e.g. amorphous $V_2S_5$), amorphous molybdenum sulfides (e.g. amorphous $MoS_3$) and the like are also included.

The cathode-active material used in the cathode of the cells of the present invention, as mentioned, is preferably a chalcogenide selected from those described above. However, it should be noted that the intercalatable chalcogenides are preferred and these chalcogenies are such that, in the discharged state they are intercalated and in the charged state they are intercalatable and contain no measurable intercalated species. During charge and discharge, some intercalated species are present.

The cathode structure itself need not necessarily consist of the cathode-active material alone, but may be a structure such as carbon, nickel, zinc, etc., upon which the cathode-active material is deposited. In one preferred embodiment, however, the cathode structure consists entirely of the cathode-active material. Thus, the cathode-active material is typically a good electronic conductor and may often serve as its own current collector. Also, the cathode-active material may be admixed or diluted with a minor amount of any other electrochemically active material, and alloys (i.e., solid solutions) of the individual cathode-active materials may be used. The cathode may be readily fabricated from the individual or alloyed cathode-active materials using materials and methods well known in the prior art. For example, polytetrafluoroethylene bonding agents or support structures such as nickel or copper mesh may be included.

The electrolyte employed in the cell of the present invention is one which is a solid composition containing an electrolytically active amount of one or more compounds having the formula:

$$A_xB_yC_2 \qquad (1)$$

wherein A is an alkali metal, wherein B is an element selected from the group consisting of boron and aluminum, wherein C is a chalcogen selected from the group consisting of sulfur, selenium, and tellurium, wherein x and y are numerical values each greater than zero and wherein $x+3y=4$. (Thus, by these definitions, x must inherently be less than 4 and y less than 1.33).

Desirably the alkali metal A is selected from the group consisting of lithium, sodium, and potassium. Preferably this alkali metal A is lithium or sodium, with lithium being the most preferred. In general, the element B is selected from the group described, with boron being preferred. The chalcogen C is sulfur, selenium, or tellurium, with sulfur and selenium being more desirable and with sulfur being the preferred embodiment. It should be noted that, with respect to the mentioned element B, not only may B be one of the two mentioned elements, but it also may comprise a mixture of the two elements described.

Among the compounds embodied by Formula (1) are: $Li_{0.9}B_{0.9}S_{1.8}$; $Li_{1.2}Al_{0.8}S_{1.8}$; $LiAlS_2$; $LiAlSe_2$; $LiAlTe_2$; $LiBS_2$; $LiBTe_2$, $Na_{0.9}B_{1.1}Se_{2.1}$; $LiB_{0.6}Al_{0.4}S_2$; $Li_{0.25}B_{1.25}S_2$ (also written as $LiB_5S_8$), as well as analogues thereof within the above stated Formula (1) limitations.

The electrolyte compound of Formula (1) may be prepared by any available technique. Thus, for example, it has been reported that $LiBH_4$ reacts with sulfur at 300° C. to yield the compound $LiBS_2$ (H. Noth and G. Mikulaschek, Z. Anorg. Chem., Vol. 311, p. 241 et seq., 1961). Analogous synthesis may be employed for many of the other compounds used in the electrolyte of the present invention as set forth above.

In the alternative, the compounds of Formula (1) above may be prepared by direct reaction of the metal chalcogen compound with the alkali metal chalcogen compound of the desired product. For example, $B_2S_3$ may be reacted with $Li_2S$ to yield $LiBS_2$. An analogous direct reaction technique may be used to prepare other compounds of the electrolytes used in the present invention. These syntheses techniques will become more apparent from the description thereof in the examples below.

The compounds of Formula (1) above may be used by themselves as the solid electrolyte material in the cells of the present invention. In the alternative, and more preferably for economic as well as performance optimization reasons, the Formula (1) compounds may be mixed with the cathode-active material to be used in the cell being prepared. For example, in a cell containing a lithium anode and a titanium disulfide cathode, the Formula (1) composition may be admixed with powdered titanium disulfide prior to being incorporated into a cell of the present invention. As yet another alternative, the Formula (1) compounds used in the electrolytes of the present invention may be admixed with other electrolytically active material, cathode-active material or inert solid material, with or without the specific cathode active material to be used in the cathode of the cell being prepared. Thus, for example, $LiBS_2$ may be admixed with lithium diode and titanium disulfide.

The solid state electrolyte employed in the cell of the present invention may be placed between the cathode and the anode to achieve an advantageous electrochemical cell. In one embodiment, the electrolyte is rolled into or pressed into a thin sheet of about 10 mils or less. In another embodiment, the solid electrolyte may be melted and then cooled to form a solid sheet. In any event, the electrolyte containing one or more of the Formula (1) type compounds may be formed into known solid electrolyte configurations for use in the electrochemical cell.

The present invention is illustrated by the following examples, but the invention should not be construed to be limited thereto:

EXAMPLE 1

A lithium boron sulfide sample was prepared by reacting a mixture of 0.28 g $Li_2S$ and 0.73 g $B_2S_3$. The mixture was loaded into a silica tube which was sealed under vacuum and heated at 200° C. for 24 hours, then heated at 300° C. for 24 hours, and lastly heated at 400° C. for 24 hours.

EXAMPLE 2

A lithium boron sulfide sample was prepared from $LiBH_4$. $LiBH_4$ was placed in an alumina boat which was then placed in a silica tube. The tube was sealed, removed from a dry box, attached to a 15% $H_2S$, 85% helium line and heated at 450° C. in a 15% $H_2S$, 85% helium gas stream for 1 hour. The tube was cooled to room temperature and filled with pure helium. The tube was then resealed and returned to the dry box to prevent moisture contamination of the electrolyte compound.

EXAMPLE 3

A lithium boron sulfide sample was prepared by reacting 1.5 grams of LiBH$_4$ and 8.86 grams of sulfur. These two reactants were mixed and placed in an alumina boat which was then placed in a silica tube. The tube was sealed, removed from a dry box attached to a helium line and heated at 300° C. for three hours in a helium gas stream. After this time the tube was resealed and returned to the dry box to prevent moisture contamination of the electrolyte compound.

ANALYSIS OF EXAMPLE 1, EXAMPLE 2 AND EXAMPLE 3 COMPOUNDS

X-ray powder patterns of the compounds, obtained in Examples 1, 2 and 3 were taken with CuK$_\alpha$ radiation. The compound prepared by Example 1 gave a complex powder pattern with many lines whereas the compound prepared by Example 2 gave a simple pattern with relatively few sharp lines whose positions indicated a face centered cubic structure. The compound prepared by Example 3 gave an X-ray powder pattern with lines corresponding to the lines observed for the compounds prepared by Examples 1 and 2. No lines due to starting materials were observed in any of the samples.

Figure 2:
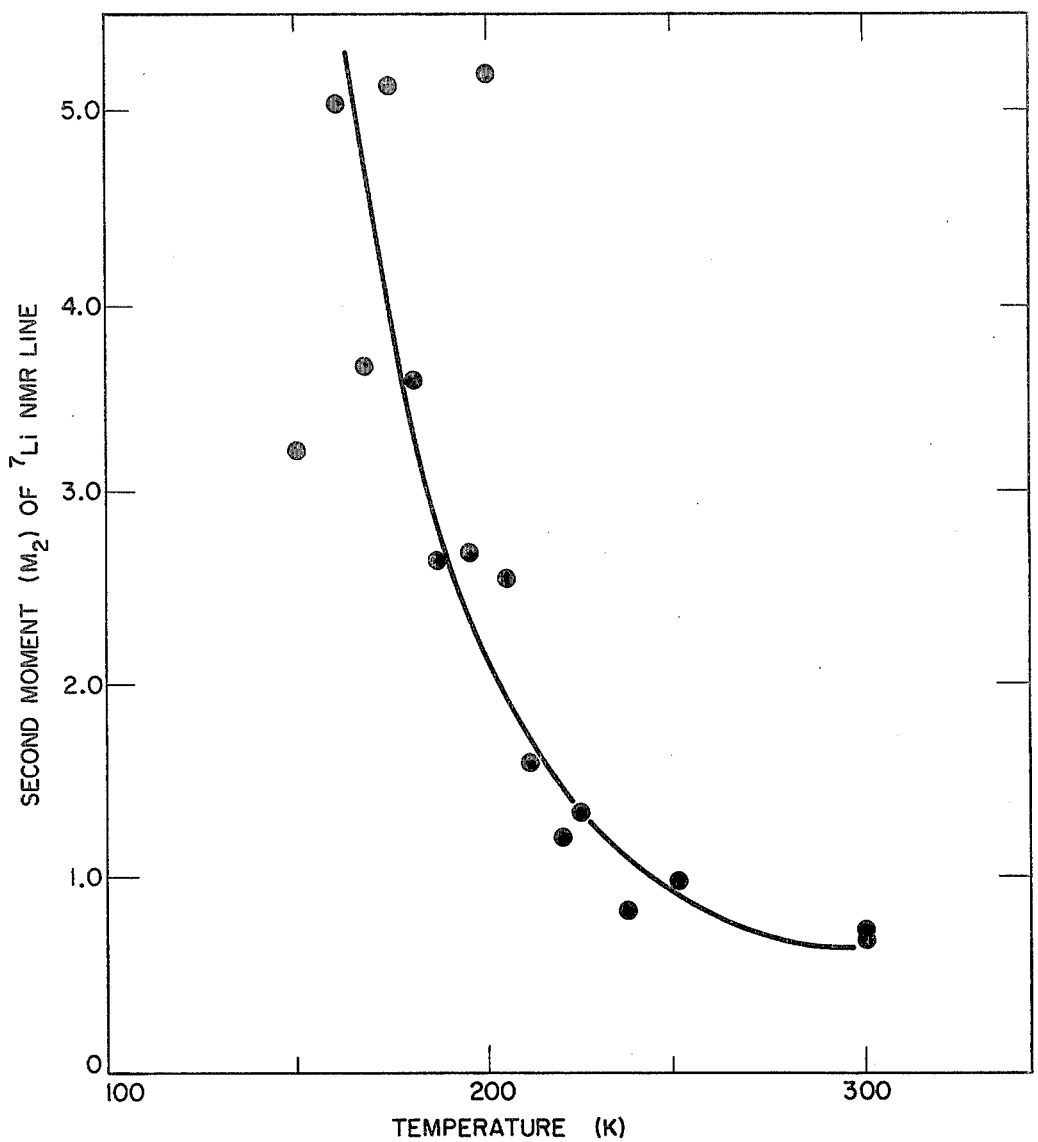
Figure 3:
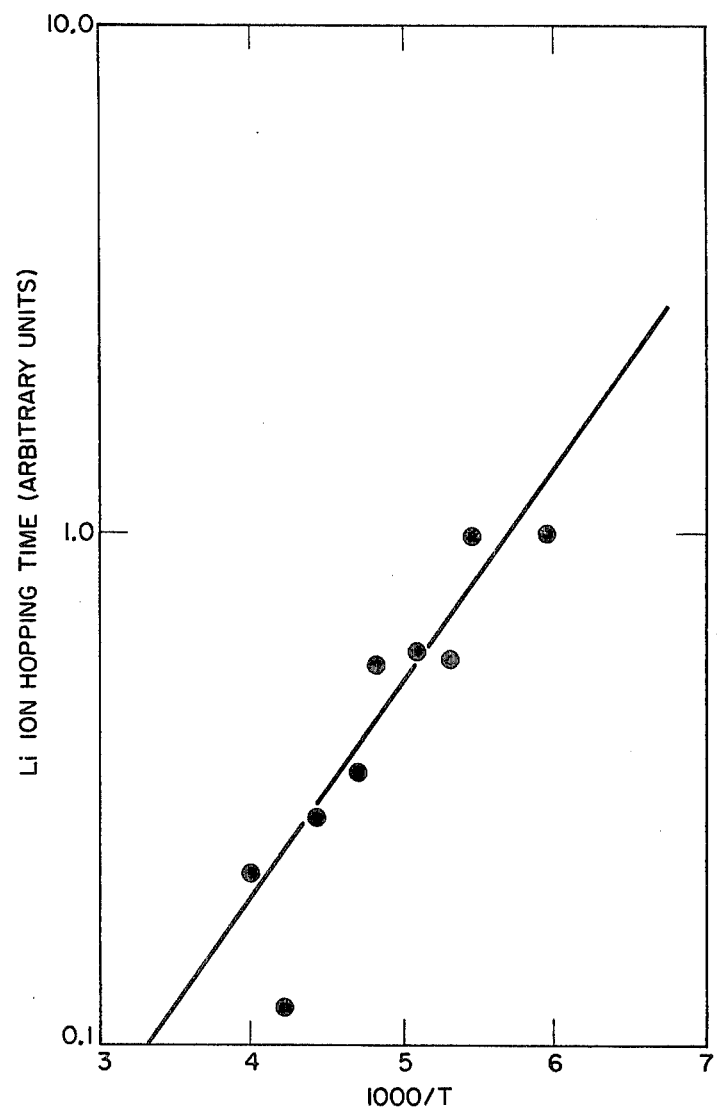

A lithium-7 NMR study of the compounds obtained by Examples 1, 2 and 3 was made. All three compounds were completely motionally narrowed at ambient temperature. There was no evidence of any underlying broad component, indicating that all of the lithium atoms were contributing to the narrowing. The line width was measured as a function of temperature for the Example 1 compound. The resonance broadens in the vicinity of −48° C. as shown in FIGS. 1 and 2. In FIG. 3, the ionic hopping time as a function of the reciprocal of the temperature is shown, and an activation energy of about 2 kilocalories per mole is derived. The boron 11 NMR of the samples prepared by Examples 1, 2 and 3 are found to possess a narrow (2.8 g) central component which is similar for all three materials and different from that of LiBH$_4$.

No $^1$H NMR signals were found for samples prepared with LiBH$_4$ as a starting material, further indicating the complete conversion of this reactant.

EXAMPLE 4

In order to obtain an estimate of the lithium ionic transport number, electrochemical cells were constructed using titanium disulfide cathodes and lithium anodes. Cells were made from the electrolyte materials prepared by Examples 1, 2 and 3. A mixture of titanium disulfide and the lithium boron sulfide material was made and pressed into a pellet. Next the pure lithium boron sulfide was added and the entire mixture repelletized. The composite pellet was placed in a Teflon holder which had a lithium anode and copper electrodes for contacts. The open circuit voltages at ambient temperature were measured with a high impedance electrometer. The results for the three materials were 2.51, 2.54 and 2.51 volts respectively for compounds prepared by Examples 1, 2 and 3. The theoretical open circuit voltage for a lithium titanium disulfide cell is about 2.45 volts at ambient temperature. Therefore, within experimental error the ionic transport numbers of the three materials are close to 1.0.

EXAMPLE 5

For material prepared by Example 3 an estimate was made of the ionic conductivity using a test cell as described in Example 4. The electrolyte pellet was less than 1 mm thick and was 13 mm in diameter. The test cell was discharged at constant currents of 1, 2 and 3 micro-amps giving voltages of 2.15, 1.91 and 1.68 volts respectively. These results indicate a total cell internal resistance of about $2 \times 10^5 \Omega$. The cell resistance per cm$^2$ cross sectional area is about $3 \times 10^5$.

EXAMPLE 6

A test cell was prepared as in Example 5 except that the electrolyte was prepared by Example 1 and the pellet was 6 mm in diameter. The test cell was discharged at 0.1, 0.2 and 0.3 microamps and gave voltages of 2.20, 2.02 and 1.84 volts respectively. These results indicate a total cell internal resistance of $2 \times 10^6 \Omega$. The cell resistance per square centimeter of cross sectional area is $6 \times 10^5 \Omega$.

EXAMPLE 7

A test cell was prepared as in Example 5 with electrolyte pellet diameter 6 mm and electrolyte prepared as in Example 2. The cell was discharged at 0.1, 0.2 and 0.3 microamps and gave voltages of 1.93, 1.43 and 0.92 volts respectively. These results indicate a total cell resistance of $5 \times 10^6 \Omega$. The cell resistance per square centimeter of cross sectional area is $1 \times 10^6 \Omega$.

EXAMPLE 8

AC conductivity measurements were made on a 6 mm pellet of material as prepared by Example 3. After hand pressing, the pellet was sintered in H$_2$S at 400° C. The pellet was 1.1 mm thick after sintering. The pellet was sandwiched between 6 mm lithium sheet electrodes and the sandwich compressed between platinum sheets in a silica holder. The values of the conductivity which were obtained at 25° C. were $1.8 \times 10^{-5}$, $5.4 \times 10^{-6}$, $3.7 \times 10^{-6}$ and $3.4 \times 10^{-6}$ $(\Omega\ cm)^{-1}$ at AC frequencies of 1 megahertz, 100 kilohertz, 10 kilohertz and 1 kilohertz. The corresponding values at 85° C. were $4.9 \times 10^{-5}$, $3.5 \times 10^{-5}$, $3.2 \times 10^{-5}$, and $3.1 \times 10^{-5}$ $(\Omega\ cm)^{-1}$.

What is claimed is:

1. In an electric current-producing cell containing an anode having an alkali metal as its anode-active material, an electrolyte, and a chalcogenide-containing cathode, the improvement comprising:
    said electrolyte being a solid composition containing an electrolytically active amount of one or more compounds having the formula:

$A_xB_yC_2$ 

wherein A is an alkali metal, wherein B is an element from the group consisting of boron, aluminum and mixtures thereof, wherein C is a chalcogen selected from the group consisting of sulfur, selenium and tellurium, wherein x and y are numerical values greater than zero and wherein $x+3y=4$.

2. The cell of claim 1 wherein said alkali metal A is selected from the group consisting of lithium and sodium.

3. the cell of claim 2 wherein said element B is boron.

4. The cell of claim 3 wherein said chalcogen C is selected from the group consisting of sulfur and selenium.

5. The cell of claim 4 wherein said anode has an anode-active material which is the same alkali metal as the alkali metal A in the electrolyte.

6. The cell of claim 5 wherein said chalcogen is sulfur.

7. The cell of claim 6 wherein said alkali metal A is lithium and wherein said anode has lithium as its anodic active material.

8. The cell of claim 2 wherein said element B is aluminum.

9. The cell of claim 8 wherein said chalcogen C is selected from the group consisting of sulfur and selenium.

10. The cell of claim 9 wherein said chalcogen C is sulfur.

11. The cell of claim 10 wherein said alkali metal A is lithium and wherein said anode has lithium as its anode-active material.

12. In an electric current-producing cell containing an anode having an alkali metal as its anode-active material, an electrolyte, and a cathode having as its cathode-active material, one or more chalcogenides selected from the sulfides, selenides and tellurides of titanium, zirconium, hafnium, niobium, tantalum and vanadium, the improvement comprising:
said electrolyte being a solid composition containing an electrolytically active amount of one or more compounds having the formula:

$$A_xB_yC_2$$

wherein A is an alkali metal, wherein B is an element from the group consisting of boron, aluminum and mixtures thereof, wherein C is a chalcogen selected from the group consisting of sulfur, selenium and tellurium, wherein x and y are numerical values greater than zero and wherein $x+3y=4$.

13. The cell of claim 12 wherein said alkali metal A is selected from the group consisting of lithium and sodium.

14. The cell of claim 13 wherein said element B is boron.

15. The cell of claim 14 wherein said chalcogen is selected from the group consisting of sulfur and selenium.

16. The cell of claim 15 wherein said anode has an anode-active material which is the same alkali metal as the alkali metal A in the electrolyte.

17. The cell of claim 16 wherein said chalcogenide in said cathode contains the same chalcogen as the chalcogen in the electrolyte.

18. The cell of claim 17 wherein said chalcogen C is sulfur.

19. The cell of claim 13 wherein said element B is aluminum.

20. The cell of claim 19 wherein said chalcogen C is selected from the group consisting of sulfur and selenium.

21. The cell of claim 20 wherein said chalcogenide in said cathode contains the same chalcogen as the chalcogen C in the electrolyte.

22. The cell of claim 21 wherein said chalcogen C is sulfur.

23. The cell of claim 13 wherein said chalcogenides are selected from the sulfides, selenides and tellurides of titanium, niobium, tantalum and vanadium.

24. The cell of claim 23 wherein said alkali metal A is selected from the group consisting of lithium and sodium.

25. The cell of claim 24 wherein said element B is boron.

26. The cell of claim 25 wherein said chalcogen C is selected from the group consisting of sulfur and selenium.

27. The cell of claim 26 wherein said anode has an anode-active material which is the same alkali metal as the alkali metal A in the electrolyte.

28. The cell of claim 27 wherein said chalcogenide in said cathode contains the same chalcogen as the chalcogen C in the electrolyte.

29. The cell of claim 24 wherein said element B is aluminum.

30. The cell of claim 29 wherein said chalcogen C is selected from the group consisting of sulfur and selenium.

31. The cell of claim 30 wherein said alkali metal A is lithium and wherein said anode has lithium as its anodic active material.

32. The cell of claim 31 wherein said chalcogenide in said cathode contains the same chalcogen as the chalcogen C in the electrolyte.

33. The cell of claim 25 wherein said chalcogenide in said cathode is titanium disulfide.

34. The cell of claim 29 wherein said chalcogenide in said cathode is titanium disulfide.

* * * * *